United States Patent
Schejter et al.

(10) Patent No.: US 8,458,647 B2
(45) Date of Patent: Jun. 4, 2013

(54) METHOD AND APPARATUS FOR GRAPHICALLY CONSTRUCTING APPLICATIONS UTILIZING INFORMATION FROM MULTIPLE SOURCES

(75) Inventors: Lior Schejter, Hod Hasharon (IL); Yuval Gilboa, Pardesiya (IL)

(73) Assignee: SAP Portals Israel Ltd., Ra'Anana (IL)

( * ) Notice: Subject to any disclaimer, the term of this patent is extended or adjusted under 35 U.S.C. 154(b) by 2023 days.

(21) Appl. No.: 11/370,016

(22) Filed: Mar. 7, 2006

(65) Prior Publication Data
US 2007/0213972 A1 Sep. 13, 2007

(51) Int. Cl.
*G06F 9/44* (2006.01)
*G06F 15/16* (2006.01)

(52) U.S. Cl.
USPC ........... 717/104; 717/106; 717/120; 709/204; 709/230; 719/313

(58) Field of Classification Search
None
See application file for complete search history.

(56) References Cited

U.S. PATENT DOCUMENTS

| | | | | |
|---|---|---|---|---|
| 5,706,434 A * | 1/1998 | Kremen et al. | | 709/218 |
| 6,311,278 B1 * | 10/2001 | Raanan et al. | | 726/14 |
| 6,321,337 B1 * | 11/2001 | Reshef et al. | | 726/14 |
| 6,427,071 B1 * | 7/2002 | Adams et al. | | 455/403 |
| 6,473,407 B1 * | 10/2002 | Ditmer et al. | | 370/252 |
| 6,631,402 B1 * | 10/2003 | Devine et al. | | 709/217 |
| 6,766,351 B1 * | 7/2004 | Datla | | 709/203 |
| 6,772,216 B1 * | 8/2004 | Ankireddipally et al. | | 709/230 |
| 6,931,016 B1 * | 8/2005 | Andersson et al. | | 370/401 |
| 6,985,958 B2 * | 1/2006 | Lucovsky et al. | | 709/230 |
| 7,218,613 B1 * | 5/2007 | Doskow et al. | | 370/252 |
| 7,349,384 B2 * | 3/2008 | Hill et al. | | 370/352 |
| 7,401,148 B2 * | 7/2008 | Lewis | | 709/228 |
| 7,409,672 B1 * | 8/2008 | Datla | | 717/106 |
| 7,533,365 B1 * | 5/2009 | Hogstrom et al. | | 717/105 |
| 7,552,440 B1 * | 6/2009 | Stewart et al. | | 719/312 |
| 7,580,831 B2 * | 8/2009 | Haskell et al. | | 704/10 |
| 7,711,836 B2 * | 5/2010 | Videlov et al. | | 709/230 |
| 7,721,262 B2 * | 5/2010 | Reinhardt | | 717/124 |
| 7,721,293 B2 * | 5/2010 | Savchenko et al. | | 719/313 |
| 7,788,338 B2 * | 8/2010 | Savchenko et al. | | 709/218 |
| 7,813,831 B2 * | 10/2010 | McCoy et al. | | 700/198 |
| 8,280,353 B2 * | 10/2012 | Patron et al. | | 455/412.1 |
| 2002/0176427 A1 * | 11/2002 | Noda et al. | | 370/401 |
| 2003/0163722 A1 * | 8/2003 | Anderson, IV | | 713/200 |
| 2004/0210663 A1 * | 10/2004 | Phillips et al. | | 709/230 |
| 2004/0216127 A1 * | 10/2004 | Datta et al. | | 719/313 |
| 2005/0135387 A1 * | 6/2005 | Rychener et al. | | 370/401 |
| 2005/0180418 A1 * | 8/2005 | Andersen et al. | | 370/389 |
| 2006/0031167 A1 * | 2/2006 | Kastelewicz et al. | | 705/52 |
| 2006/0167818 A1 * | 7/2006 | Wentker et al. | | 705/64 |
| 2006/0259898 A1 * | 11/2006 | Reinhardt | | 717/124 |
| 2007/0067473 A1 * | 3/2007 | Baikov et al. | | 709/230 |
| 2008/0301783 A1 * | 12/2008 | Abrutyn et al. | | 726/5 |

* cited by examiner

*Primary Examiner* — Tuan Q. Dam
*Assistant Examiner* — Zheng Wei
(74) *Attorney, Agent, or Firm* — Buckley, Maschoff & Talwalkar LLC (57) ABSTRACT

A software component and method for constructing computer applications running on different runtime environments, which consume services provided in multiple protocols. Usage of the component and method is preferably done by a content professional and does not require programming knowledge for supporting the runtime environments or the protocols.

17 Claims, 5 Drawing Sheets

```
-<Request type="executeFunction" system="R3" systemType="SAPFactory"
404 ~function="BAPI_BANK_GETLIST" encode="Y" commit="N" convert="N">
   <Input name="INPUT" shape="OBJ">
   -<Meta>
      <field name="BANK_CTRY" appName="BANK_CTRY" type="string" />
      <field name="MAX_ROWS" appName="MAX_ROWS" type="int" />
   </Meta>
408 ~ <Row BANK_CTRY="US" MAX_ROWS="11" />
   </Input>
   <Output name="RETURN" appName="RETURN" shape="OBJ" capacity="0" />
   <Output name="BANK_LIST" appName="BANK_LIST" shape="SET" capacity="0" />
</Request>
```

FIG. 4

```xml
<Response type="executeFunction" convert="false" commit="false" encode="true" function="BAPI_BANK_GETLIST" system="R3" systemType="SAPFactory">
  <RETURN>
    <meta>
      <field name="TYPE" type="10" />
      <field name="ID" type="10" />
      <field name="NUMBER" type="10" />
      <field name="MESSAGE" type="10" />
      <field name="LOG_NO" type="10" />
      <field name="LOG_MSG_NO" type="10" />
      <field name="MESSAGE_V1" type="10" />
      <field name="MESSAGE_V2" type="10" />
      <field name="MESSAGE_V3" type="10" />
      <field name="MESSAGE_V4" type="10" />
      <field name="PARAMETER" type="10" />
      <field name="ROW" type="5" />
      <field name="FIELD" type="10" />
      <field name="SYSTEM" type="10" />
    </meta>
    <Row TYPE="" ID="" NUMBER="000" MESSAGE="" LOG_NO="" LOG_MSG_NO="000000" MESSAGE_V1="" MESSAGE_V2="" MESSAGE_V3="" MESSAGE_V4="" PARAMETER="" ROW="0" FIELD="" SYSTEM="" />
  </RETURN>
  <BANK_LIST>
    <meta>
      <field name="BANK_CTRY" type="10" />
      <field name="BANK_KEY" type="10" />
      <field name="BANK_NAME" type="10" />
      <field name="CITY" type="10" />
    </meta>
    <Row BANK_CTRY="US" BANK_KEY="083000108" BANK_NAME="First Union Bank & Trust" CITY="Chicago" />
    <Row BANK_CTRY="US" BANK_KEY="123123123" BANK_NAME="Citibank" CITY="New York" />
    <Row BANK_CTRY="US" BANK_KEY="123445678" BANK_NAME="Chase Manhattan Bank" CITY="New York City" />
    <Row BANK_CTRY="US" BANK_KEY="123456789" BANK_NAME="Fidelity Bank" CITY="Los Angeles" />
    <Row BANK_CTRY="US" BANK_KEY="13000609" BANK_NAME="Bank of Houston" CITY="Houston" />
    <Row BANK_CTRY="US" BANK_KEY="13432904" BANK_NAME="Citibank" CITY="Miami" />
  </BANK_LIST>
</Response>
```

FIG. 5

METHOD AND APPARATUS FOR GRAPHICALLY CONSTRUCTING APPLICATIONS UTILIZING INFORMATION FROM MULTIPLE SOURCES

BACKGROUND OF THE INVENTION

1. Field of the Invention

The present invention generally relates to a method and apparatus for generating computer applications that utilize information from multiple diverse sources.

2. Discussion of the Related Art

In environments, such as large organizations using multiple data sources, a known difficulty is the accessibility to existing information. Significant amounts of experience or prior knowledge about available data and used systems is required in order to access data, including for example information about customers, employees, sales, inventory, billing, bank accounts and the like. However, even when such knowledge exists, various systems do not necessarily provide compatible interfaces that enable automatic integration of information from multiple sources. Such systems communicate in various and possibly different protocols, and do not always run on the same runtime platforms. When creating data access and integration applications, a known methodology is to model an application once but generate it for various runtime platforms which use different execution mechanisms. For example, a rich client application may run all application logic on the client while using the server only for persistence or state management, while a thin client application may run its entire business logic in the server. The concept of common modeling and separate generation suffers from a number of drawbacks. First, an application may be required to access back end services using different protocols, depending on the specific runtime platform, while keeping the runtime semantics the same for all used platforms. An application may be required to access a service using one protocol at one time and another protocol at another time. Therefore, the protocol used to access back end services must be decoupled from the actual service consumed and from the client platforms. In addition, certain platforms may suffer from performance degradation when using a generic modeling approach, where known optimization techniques may fail to preserve model semantics and are therefore unusable in these scenarios. Thus, in order to maintain the modeling semantics while keeping application performance reasonable, some modeling aspects may also involve modeling of back end services.

In addition, modeling of back end services, and accessing services using multiple protocols and supporting multiple runtime environments require knowledge and skill in computer programming and non negligible effort. These factors necessitate professional computer programmers and time resources in order to efficiently produce applications answering specific needs. In addition, such personnel is not necessarily a content specialist, and needs cooperation with other professionals that possess accurate and up-to-date information about the customers' needs in terms of information and presentation requirements.

There is therefore a need for a method and apparatus that will enable to efficiently construct applications running in different runtime environments and using different protocols to access data from multiple sources. Such method and apparatus should enable a graphical user interface and not require programming skills.

SUMMARY OF THE PRESENT INVENTION

It is an object of the present invention to provide a novel method for enabling an application to consume services, independent of the platform or the protocol. In accordance with the present invention, there is thus provided a method for enabling one or more applications running in one or more environments to consume one or more services using one or more protocols, the method comprising: receiving one or more messages from the application, identifying the protocol of the message, performing structural parsing of the message to obtain a first parsed request; performing contextual parsing of the first parsed request to obtain a second parsed request and sending the second parsed request to a service provider. The method can further comprise a receiving step for receiving one or more responses from the service provider, one or more formatting steps for formatting the response to obtain one or more formatted response, and a sending step for sending the formatted response to the application. Within the method the one or more formatting steps can be two formatting steps. One formatting step can perform structural formatting and one formatting step can perform semantic formatting. The method can further comprise the steps of modeling the application and generating computer code based on the modeling. The method can further comprise the step of compiling the computer code and generating the application. The method can also comprise the steps of uploading one or more applications to a server and storing one or more software components for enabling one or more applications to consume the service. The method can further comprise the step of running the application consuming one or more services using one or more protocols in the one or more environments. Another aspect of the disclosed invention relates to a data processing apparatus for enabling one or more applications running in one or more environments to consume one or more services using one or more protocols for transferring data, the apparatus comprising one or more broker objects for receiving one or more requests using a protocol from the one or more applications running in the one or more environments and determining the protocol, one or more broker protocols for structural parsing the request, one or more request parsers for contextual parsing the request, one or more service-representing objects for communicating with one or more service entities and providing one or more responses from the service entity, and one or more response formatters for formatting the one or more responses. The apparatus can further comprise one or more components for receiving one or more actions of a user and generating application code. Within the apparatus, the user can be an application developer. The action can be of the group consisting of: drag-and-drop, choosing from menu, mouse click, keyboard stroke, or voice commands.

Yet another aspect of the disclosed invention relates to a computer readable storage medium containing a set of instructions for a general purpose computer, the set of instructions comprising, receiving one or more messages from one or more applications, identifying the protocol of the messages, performing structural parsing of the messages to obtain a first parsed request; performing contextual parsing of the first parsed request to obtain a second parsed request, sending the second parsed request to a service provider, receiving one or more responses from the service provider, formatting the responses to obtain one or more formatted responses, and sending the formatted responses to the applications.

BRIEF DESCRIPTION OF THE DRAWINGS

The present invention will be understood and appreciated more fully from the following detailed description taken in conjunction with the drawings in which:

FIG. 5 shows an example to a response, in accordance with the preferred embodiment of the disclosed invention.

DETAILED DESCRIPTION OF THE PREFERRED EMBODIMENT

The present invention overcomes the disadvantages of the prior art by providing a novel method and apparatus for automatic generation of computer program instructions to be used on multiple environments through multiple protocols.

The present invention comprises a computer program that enables an application developer to define, generate, and store an application that accesses data from multiple sources. The definition includes the data presented by the application, the data flow, and the user interface of the application, including the presentation details and the response to external events such as mouse clicks and the like. The application is preferably generated through an automatic code generation, and compilation of the generated code. The generated application implements the user-interface and data flow as defined by the application developer, and comprises a data processing apparatus that during runtime constructs objects that intermediate between the user interface and the data sources. For convenience, the data processing apparatus is herein referred to as component. This code is not accessible to the end user of the application, as well as to the application developer, thus sparing both the bother of connecting different services employing different data transfer protocols and running on different runtime environments. The mediating component connects and resolves the unknown details resulting from the multiple runtime environments and multiple data transfer protocols possibly available for each service.

Making and using the disclosed invention is generally done in four stages. The first stage comprises writing a computerized tool which provide protocol-free and environment-free connectivity between one or more applications and one or more services. Executing the first stage further comprises writing a computerized tool which provides an application developer with a graphical UI for developing an application. This stage is done once, and the developed tools can be used by application developers belonging to multiple organizations. During the second stage, an application developer using the two sets of instructions, develops one or more specific applications. For example, a developed application can be intended for a commercial organization, the application enabling an end-user to see a profiling of customers according to their home address, the articles bought by the customers or any other parameter. Since the application developer is not required to program in order to develop the application, a domain- or organization-specialist rather than a programmer is a preferred professional for application development. At the third stage the developed application is deployed for usage, preferably by a system administrator of the customer, and at the fourth stage the application is used by one or more persons, for example sales personnel within the commercial organization. The four stages are further detailed in association with FIG. 2 below.

Figure 1:
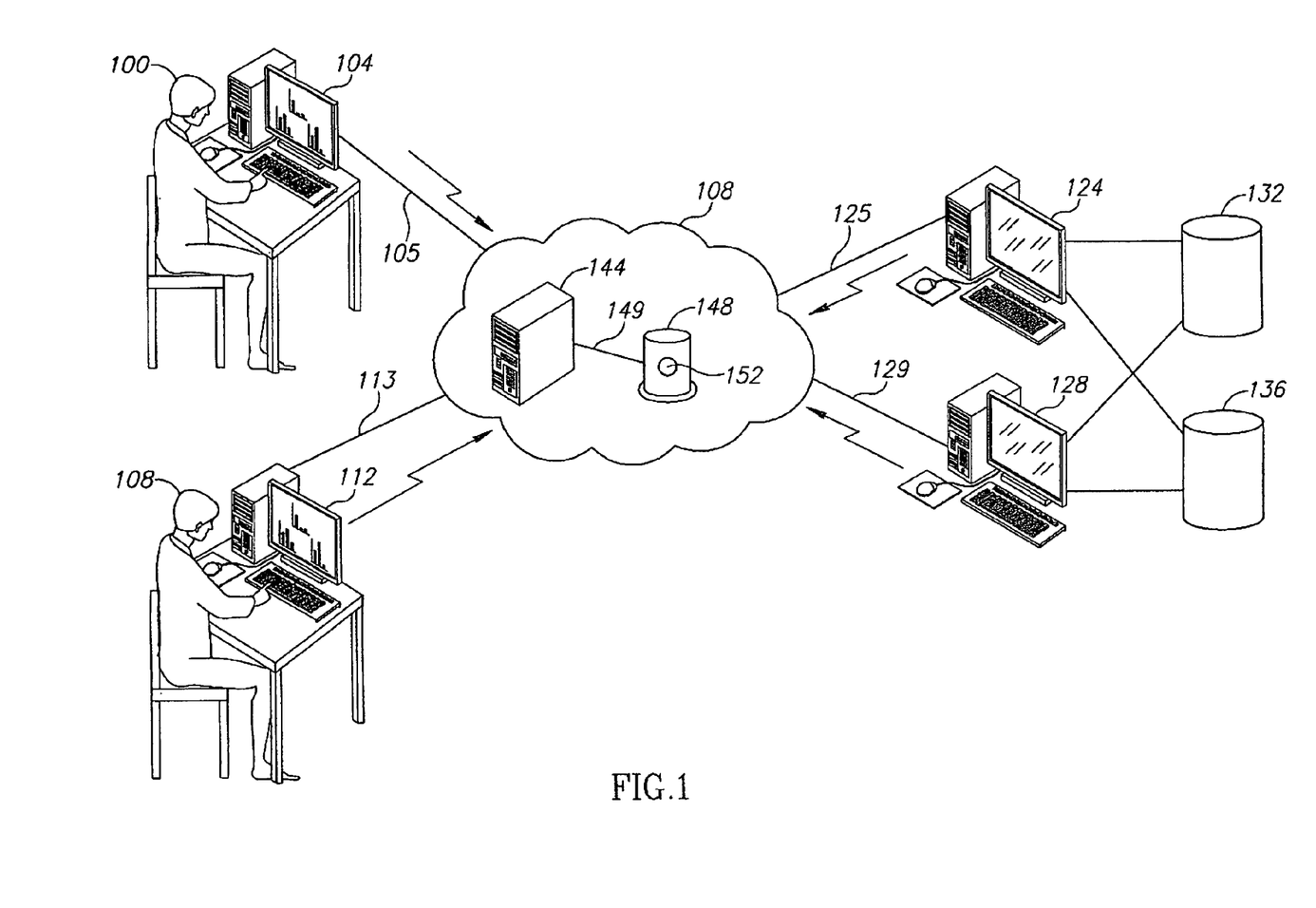
FIG. 1 is a schematic illustration of a typical environment in which the current invention is used, in accordance with a preferred embodiment of the disclosed invention.

Referring now to FIG. 1, which shows a typical environment in which the disclosed invention is used. An application developer 100 is working on a computing platform 104, designing and building an application which uses data acquired through communication channel 105 from services running on servers 124, 128, which in turn communicate through channels 125 and 129, respectively, with storages 132 or 136 storing relevant data. Once developer 104 has completed his tasks, developed application 152 is ready and stored on storage 148, and ready to be run by server 144. Then, user 108, using computing platform 112 can run via connection 113 application 152 on server 144 through communication channel 129 and use the services offered by servers 124 and 128. Neither developer 100 nor user 108 needs to know any details about the data transfer protocols used by the services or the runtime environments employed by computers 104 or 112. Computing platforms 104 and 112 can be a personal computer, a network computer, a laptop computer, a hand held device or any other computing platform, provisioned with memory device (not shown), a CPU or microprocessor device, and several I/O ports (not shown). Servers 144, 124 and 128 can also be computing platforms as detailed above, but can also be a DSP chip, an ASIC device which store and execute commands. Each of storages 124, 136 and 148 can be magnetic tape, a magnetic disc, an optical disc, a laser disc, a mass-storage device, or the like. Communication channels 105, 113, 125, 129 can be of any known technology, including Internet, Intranet over LAN, WAN, wireless network or the like.

Figure 2:
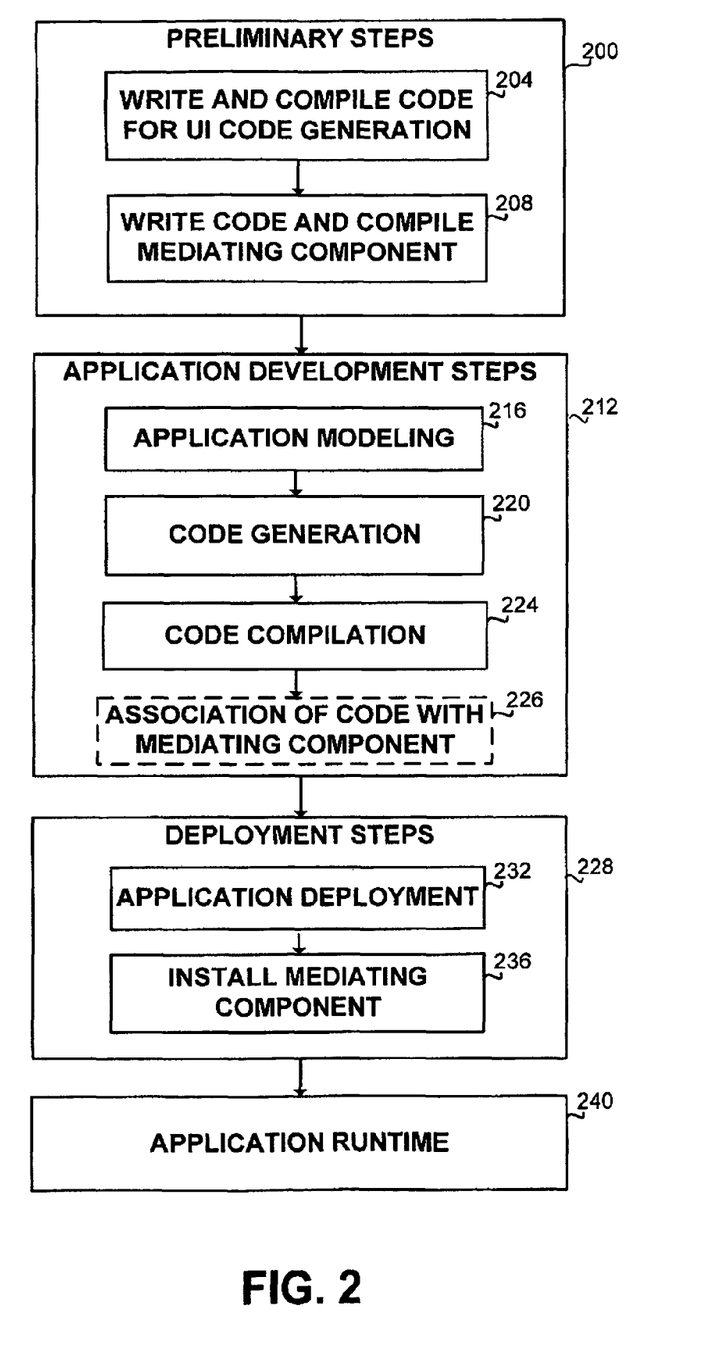
FIG. 2 is a work flow of the main steps in constructing and deploying applications, in accordance with a preferred embodiment of the disclosed invention

Referring now to FIG. 2, which shows a flowchart of the main steps in the implementation and usage of the disclosed invention. The steps are generally divided into four groups. Preliminary steps 200 which are typically performed by an implementer of the invention, application development steps 212 which are typically performed by application developers using the invention, deployment steps 228 which are typically performed by a system administrator in which one or more applications constructed at steps 212 are made available to users, and runtime step 240 which are typically performed by a user of the developed application. In Preliminary steps 200, the implementer of the invention generates an application development platform, which is later used by the application developer at step 212. Typically, preliminary steps 200 are performed once, and their output is the application development platform. At step 204 the invention implementer writes and compiles code of two types. At step 204 the implementer writes and compiles a program for automatically generating code by application developers at steps 212. The code written at step 204 enables the application developer to perform actions for modeling the application, including dragging and dropping data items, choosing from menus, keyboard strokes, and assigning behaviors to user's activities such as mouse clicks, and provides a functionality to translate the actions into code that is later run at step 240. The implementer than compiles the code-generating code into a component, such as a library, a DLL, or any other executable component. Such code generation is known in the art, and performed, for example in environments such as visual basic, DB schema creation code in SQL Server, or the like. At step 208 the implementer writes code for the mediating component, which is responsible for communicating with various services using all supported protocols and runtime environments. The code is compiled and the resulting component is later deployed at step 236 and run at step 240. The mediating code is further discussed in association with FIG. 3 below. Application development steps 212 are typically performed by an application developer using the application development platform developed at step 200 and are typically performed once for each developed application. An application developer is preferably a person who possesses knowledge about the specific customer environment, including the available data items, the interrelationships between the data items and the needs and requirements of users who consume this data. When using the current invention, the application developer is not expected to possess knowledge in computer programming. Application development steps 212 comprise application modeling step 216, during which the application developer planes the look and feel of the application, including the elements shown on the screen, the data items, the relationships or conditions the data items represent, their locations on the screen, their reaction to users' activities and the like. Once the application developer is satisfied, he uses the mechanism supplied by the application development platform and generates code out of the actions at step 220. At step 224, the generated code is compiled separately for each runtime environments, such as HTML, flash, SAP HTMLB, SAP Web Dynpro, XAML and others, thus generating one or more forms of the executable application, referred to as application 152 of FIG. 1. At step 226, the compiled product of step 224 is optionally associated with the mediating component generated at step 208, so the compiled product can use functionalities supplied by the mediation component. Depending on the employed technology, the association of the mediating component with the compiled product can be performed at compilation time, deployment time or run-time. At deployment step 288, one or more of the forms of each application compiled at step 224, is deployed on the server from which it is supposed to run, so that the application is made available for intended consumers. The deployment process can take a number of ways, such as uploading, registering, or the like. Further to deployment step 232, the mediating component developed at step 208 is installed on every computer running the applications developed at application development steps 212. Deployment steps 228 are typically performed once for each runtime environment and each application. At step 240, the application is run by an end user in a specific environment, by executing the relevant version of the application from the server, according to the desired runtime environment. During runtime, the mediating component generates and uses the correct instances of objects according to the runtime environment and the used protocols, without a requirement for awareness to the environment or the protocol from the application developer or the user. Step 240 is performed any time a user wishes to run the application.

Figure 3:
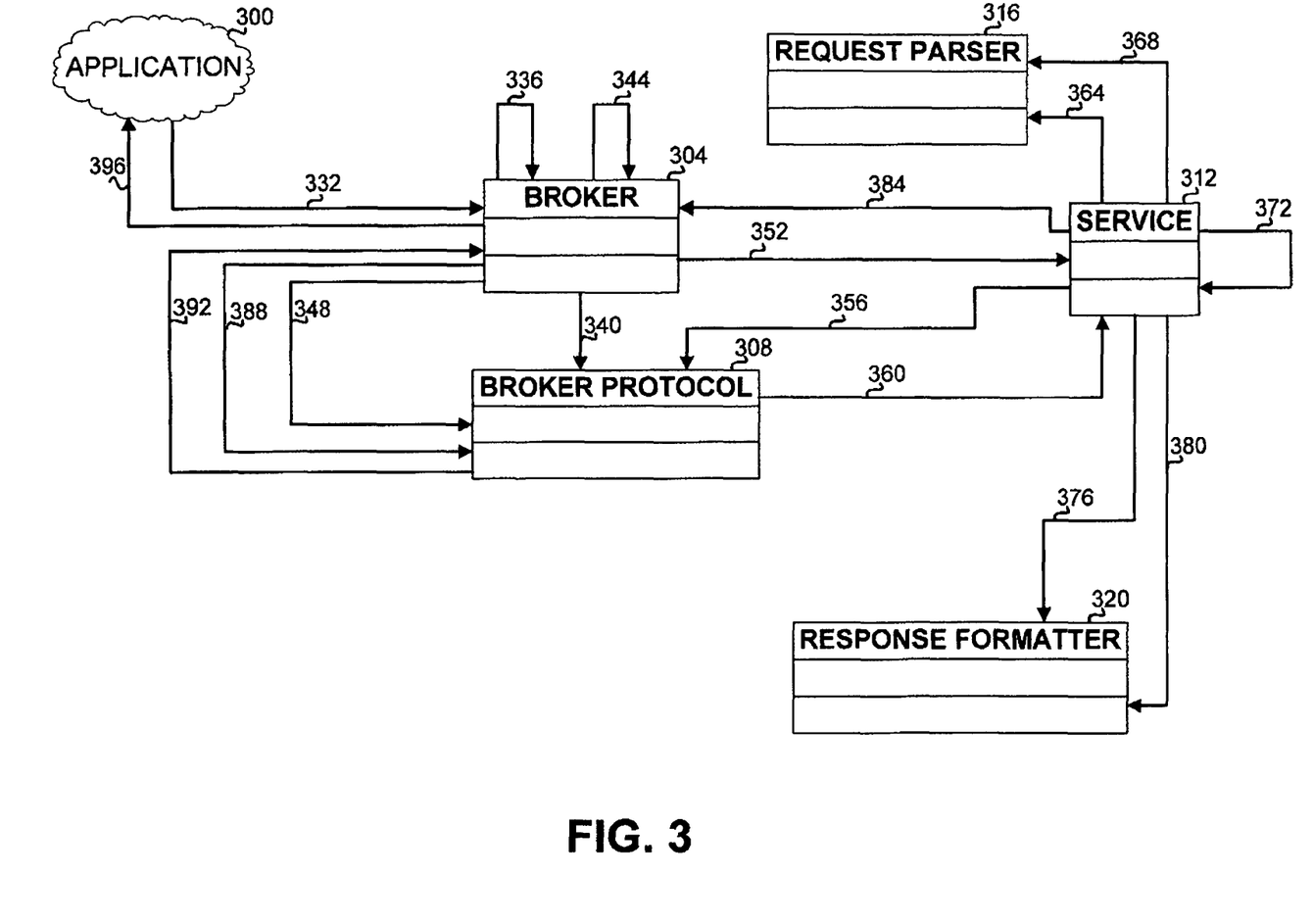
FIG. 3 is a class diagram of the run-time objects and activities taking place when an application constructed in accordance with a preferred embodiment of the disclosed invention is used.
Figure 4:
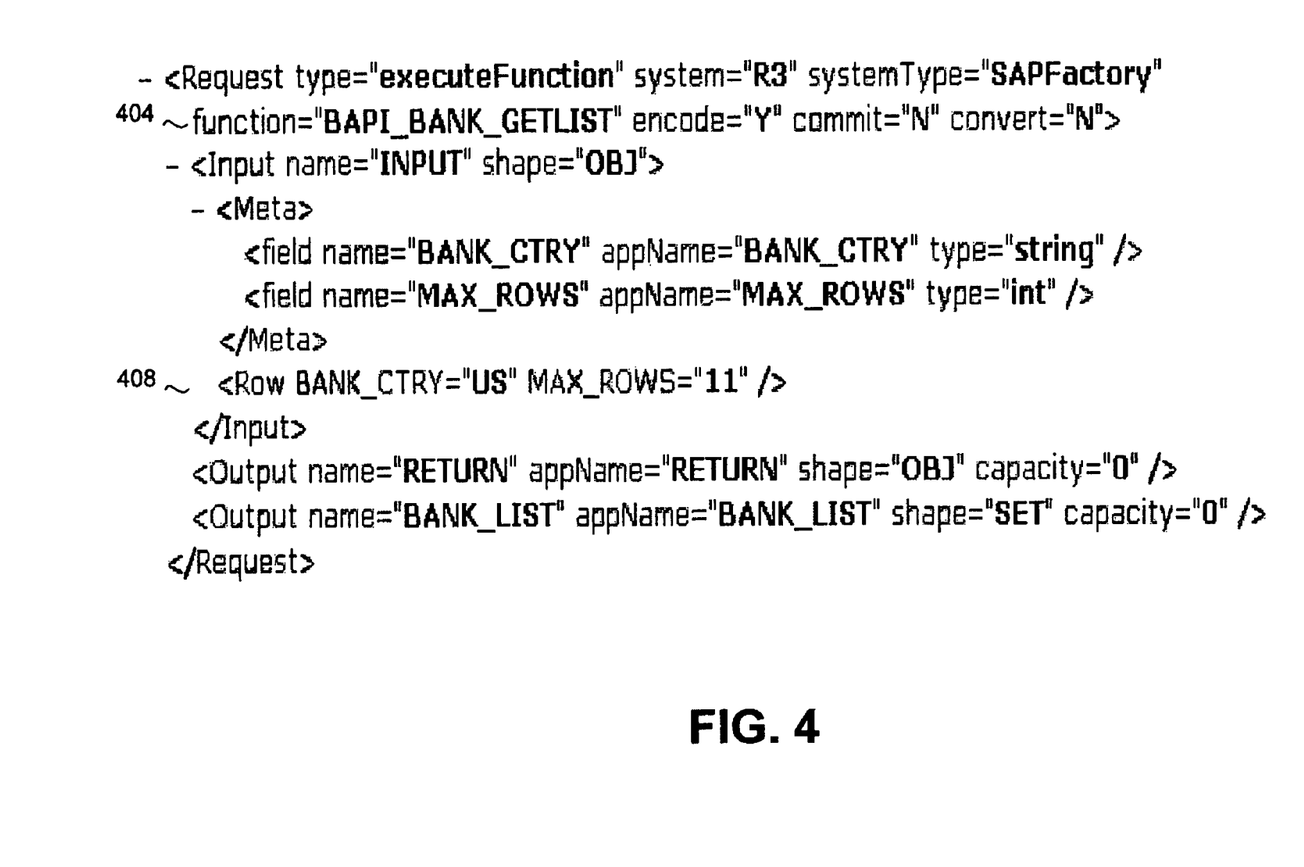
FIG. 4 shows an example to a request, in accordance with a preferred embodiment of the disclosed invention.

Referring now to FIG. 3, showing the objects constructed and messages passed in the mediating component developed at step 208 of FIG. 2, to FIG. 4 showing an example to a request sent to the mediating component and to FIG. 5 showing an example to a corresponding response. The mediating component is preferably implemented in an object-oriented environment and programming language, such as C++, C#, Java or the like. As common in object-oriented methodologies, a unit such as the mediating component is described by the implemented objects and the messages passed between them. A description of the objects and their interrelationships is presented, followed by a detailed explanation and example of the control flow and message passing.

A message representing a request from an application 300 is sent to a broker object 304, which is the main object that mediates between the application and the services. Broker object 304 relates to, by pointing, referencing or any other method to a collection of broker protocol objects 308. Broker protocol objects 308 preferably inherit from an abstract protocol object, wherein each object implements the associated methods for a specific protocol. Broker object 304 further relates to a collection of service-representing objects 312, wherein each service-representing object 312 is associated with one application-specific service, provided by an at least one service entity. Service-representing object 312 interfaces with the one or more service entities, the interface comprising transferring the request for service in an appropriate protocol and receiving the return value or parameters in an appropriate protocol. Each service-representing object 312 relates to two additional objects: a service-specific request parser 316, and a service-specific response formatter 320. A user's request is translated by application 300 to a message, in any format, such as XML, Java, SOAP, Java RMI, REST, or the like, sent in any relevant protocol, such as HTTP, HTTPS, simple method calls or others. For example, if the request is in XML format, it can be sent as a byte stream in XML over HTTP format. FIG. 4 shows an example to a request from a server to execute a function to provide a list of banks. The example request is in XML format and is sent by the user's browser in XML over HTTP protocol. Request 300, such as the one shown in FIG. 4 is sent at step 332 by the application to broker 304. At step 336 broker 304 determines the protocol the request was sent in, in the example of FIG. 4 the protocol is XML over HTTP. Once the protocol is determined, broker 304 generates and calls (or calls an already existing) broker protocol 308 implementing the methods for the specific protocol. In the example of FIG. 4, broker 304 invokes an XML over HTTP broker protocol to handle the request. Broker 304 requests at step 340 specific broker protocol 308 to perform structural parsing of the request and retrieve the specific service associated with request 300, since broker protocol 308 is the entity that implements the determined protocol, and can retrieve structural information from a request adhering to this protocol. Broker protocol 308, which can parse a message in the specific protocol, parses the message and determines the requested service. In the current example, it is determined that the request is to execute a function. Once the specific required service is determined, broker 304 creates at step 344 a specific service-representing object 312. In the context of the current example, such object will be a function-executing object. Then, at step 348 a message to parse request 300 is sent from broker 304 to broker protocol 308. As mentioned, broker protocol 308 performs structural parsing. In the current example, structural parsing comprises building an XML message from the original byte stream. The parsed request is sent at step 352 to service object 312. Since the service and the protocol are known at this stage, service 312 requests at step 356, that broker protocol 308, being an XML over HTTP broker in the example, generates an instance of a request parser 316 and an instance of response formatter 320. Both instances are protocol- and service-specific. Therefore, in the current example, object 316 is an XML-over HTTP function-execute parser, and object 320 is an XML-over HTTP function-execute response formatter. Instances 316 and 320 are sent to service object 312 at step 360. Then, at step 364, service object 312 asks request parser 316 to contextually parse the request, i.e. retrieve its type, and the relevant parameters, since request parser 316 is aware both of the protocol and of the specific request. In the context of the current example, the parser will determine as shown in 404, that the request is to retrieve a list of banks, and as shown in 408 only those banks for which the country is US, and to retrieve a maximum of 11 rows. At step 368 service object 312 asks request parser 316 for the retrieved parameters. At step 372, once service-representing object 312 possesses all the relevant parameters, object 312 executes the service, typically through interfacing or otherwise communicating with one or more actual service-performing objects, such as objects that communicate with one or more databases. In the case of a uni-directional request, wherein no response is expected by the application, the process ends here, without generating or sending a response. In other requests, such as the current example, at step 376, service-representing object 312 sends a response received at step 372, being a list of banks in the current case, to response formatter 320. Response formatter 320, being an XML-over-HTTP function-execute response formatter, can therefore format the response according to the desired protocol, and generate the response shown in FIG. 5, listing at item 504 seven (less than the allowed eleven) US banks. At step 380, service-representing object 312 asks response formatter 320 for the formatted response, and passes it to broker 304 at step 384. At step 388 broker 304 passes the response to broker protocol 308 for protocol-related formatting. In the current context, the formatting comprises translating the XML response into a byte stream. Once the byte stream is returned to broker 304 at step 392, it is sent back to application 300 at step 396. In an alternative embodiment, the response is sent directly from broker protocol 308 to application 300. Occasionally, for example when the request is a simple java method call, the response is formatted into a java object, which is returned to the application, so only one formatting step is required. Preferably, all mentioned objects are constructed during runtime for handling each request, and are destroyed once the request is handled. Alternatively, a methodology for using permanent objects can be designed, which possibly saves time and processing power, and enables session-lasting logic which is kept within the objects and is not limited to a single request.

The present methodology enables the consumption of a multiplicity of services by a multiplicity of applications. Although the applications optionally run on different runtime environments, and each service supports one or more protocols, neither the runtime environments details, nor the protocol details have to be dealt with by the designer of the application or by the user. Therefore the designer can be a content professional and work with a graphical user interface rather than use programming skills for constructing the application.

It will be appreciated to a person skilled in the art that the presented object and message diagram exemplifies a possible implementation of the invention, and that other implementations, using for example different distribution of the functionalities among objects, or different calling orders are possible as well. Additional functionalities, such as enabling internal states within the objects, composing services and thus executing them within the same request, enhancing performance for example by load balancing, or other functionalities can be added to the apparatus.

It will be appreciated by persons skilled in the art that the present invention is not limited to what has been particularly shown and described hereinabove. Rather the scope of the present invention is defined only by the claims which follow.

We claim:

1. A method for enabling an at least one application running in an at least one environment to consume an at least one service using an at least one protocol, the method comprising:
receiving an at least one message from the at least one application, the at least one message including a request for information;
identifying the protocol of the request for information included in the at least one message;
performing structural parsing of the at least one message to obtain a first parsed request;
determining the at least one service; that is requested by the request for information and provided by a service provider;
performing, by an instance of a request parser that is specific to the determined service, contextual parsing of the first parsed request to obtain a second parsed request;
sending the second parsed request to the service provider in a protocol that is different than the protocol of the request for information;
receiving at least one response that is from the service provider and includes information that is: (i) requested by the request for information and (ii) in a protocol different than the protocol of the request for information;
at least one formatting step for formatting the at least one response to obtain at least one formatted response that includes information that is: (i) requested by the request for information and (ii) in the protocol of the request for information; and
sending, to the at least one application, the at least one formatted response that includes information that is: (i) requested by the request for information and (ii) in the protocol of the request for information.

2. The method of claim 1 wherein the at least one formatting step is two formatting steps.

3. The method of claim 2 wherein one formatting step performs structural formatting and one formatting step performs semantic formatting.

4. The method of claim 1 further comprising the steps of:
modeling the at least one application; and
generating computer code based on the modeling.

5. The method of claim 4 further comprising the step of compiling the computer code and generating the at least one application.

6. The method of claim 1 further comprising the steps of:
uploading an at least one application to a server; and
storing an at least one software component for enabling an at least one application to consume the at least one service.

7. The method of claim 1 further comprising the step of running the at least one application consuming an at least one service using an at least one protocol in the at least one environment.

8. The method of claim 1 wherein a broker protocol performs:
the structural parsing of the at least one message to obtain the first parsed request; and
the determining the service that is requested by the request for information and provided by the service provider.

9. The method of claim 8 wherein a broker object calls the broker protocol and wherein the broker protocol generates the instance of the request parser.

10. The method of claim 8 wherein a broker object calls the broker protocol and creates a service object that requests that the broker protocol generate the instance of the request parser.

11. The method of claim 8 wherein a single mediator component comprises the request parser and the broker protocol.

12. The method of claim 11 wherein the mediator component performs:
the receiving the at least one message from the at least one application;
the identifying the protocol of the request for information included in the at least one message;
the performing structural parsing of the at least one message to obtain a first parsed request;

the determining the service that is requested by the request for information and provided by a service provider, the performing contextual parsing of the first parsed request to obtain a second parsed request;

the sending the second parsed request to the service provider in a protocol that is different than the protocol of the request for information;

the receiving that at least one response that is from the service provider and includes information that is: (i) requested by the request for information and (ii) in a protocol different than the protocol of the request for information;

the at least one formatting step for formatting the at least one response to obtain at least one formatted response that includes information that is: (i) requested by the request for information and (ii) in the protocol of the request for information; and the sending, to the at least one application, the at least one formatted response that includes information that is: (i) requested by the request for information and (ii) in the protocol of the request for information.

13. A data processing apparatus for enabling an at least one application running in an at least one environment to consume an at least one service using an at least one protocol for transferring data, the apparatus comprising:

a computer executing instructions for a mediating component comprising:

an at least one broker object for receiving an at least one request for information using a protocol from the at least one application running in the at least one environment and determining the protocol of the at least one request for information;

an at least one broker protocol for structural parsing the at least one request and for determining the at least one service; that is requested by the request for information and provided by an at least one service entity;

an at least one request parser that is specific to the determined service, for contextual parsing the at least one request;

an at least one service-representing object for communicating with the at least one service entity and receiving an at least one response from the at least one service entity, the at least one response from the at least one service entity including information that is: (i) requested by the at least one request for information and (ii) in a protocol different than the protocol of the at least one request for information; and an at least one response formatter for formatting the at least one response.

14. The apparatus of claim 13 further comprising an at least one component for receiving an at least one action of a user and generating application code.

15. The apparatus of claim 14 wherein the user is an application developer.

16. The component of claim 14 wherein the action is at least one of the group consisting of: drag-and-drop, choosing from menu, mouse click, keyboard stroke, or voice commands.

17. A non-transitory computer readable storage medium containing a set of instructions for a general purpose computer, the set of instructions comprising:

receiving an at least one message from an at least one application, the at least one message including a request for information;

identifying the protocol of the request for information included in the at least one message;

performing structural parsing of the at least one message to obtain a first parsed request;

determining the at least one service; that is requested by the request for information and provided by a service provider;

performing, by an instance of a request parser that is specific to the determined service contextual parsing of the first parsed request to obtain a second parsed request;

sending the second parsed request to the service provider in a protocol that is different than the protocol of the request for information;

receiving an at least one response from the service provider and includes information that is: (i) requested by the request for information and (ii) in a protocol different than the protocol of the request for information;

formatting the at least one response to obtain an at least one formatted response that includes information that is: (i) requested by the request for information and (ii) in the protocol of the request for information; and sending the at least one formatted response to the at least one application.

* * * * *